United States Patent [19]
Lee et al.

[11] Patent Number: 5,737,077
[45] Date of Patent: Apr. 7, 1998

[54] APPARATUS AND METHOD FOR TIME RESOLVED SPECTROSCOPY

[75] Inventors: Hyo Sang Lee, Silver Spring; Anthony Notari, Laurel, both of Md.

[73] Assignees: Recon Exploration, Dallas, Tex.; Science & Engineering Services, Inc., Burtonsville, Md.

[21] Appl. No.: 702,931

[22] Filed: Aug. 26, 1996

Related U.S. Application Data

[63] Continuation of Ser. No. 251,325, May 31, 1994, Pat. No. 5,565,982.
[51] Int. Cl.⁶ .................................................. G01J 3/457
[52] U.S. Cl. .................... 356/317; 250/458.1; 250/459.1
[58] Field of Search ................................. 356/318, 320, 356/317, 417; 250/458.1, 459.1, 461.1, 461.2

[56] References Cited

U.S. PATENT DOCUMENTS 5,269,900 12/1993 Jorgenson et al. .

Primary Examiner—K. Hantis
Attorney, Agent, or Firm—Jack V. Musgrove; Andrew J. Dillon

[57] ABSTRACT

A time resolved spectroscopy system and method are provided using digital processing techniques of a low power, continuous wave signal generated by a continuous wave light source, such as a cw laser. Time elapse is determined by measuring the time shift of the signal modulation sequence using the cross correlation of a return signal with the reference signal. The high resolution time delay is introduced at the start of each modulation cycle and the high resolution measurement is constructed by interlacing a data set based on the delay information. The high resolution TRS or fluorescence measurement is achieved by correlation calculation of the measured data and the reference code and deconvolving the autocorrelation function of the reference code.

4 Claims, 11 Drawing Sheets

APPARATUS AND METHOD FOR TIME RESOLVED SPECTROSCOPY

This application is a continuation of application Ser. No. 08/251,325, filed 31 May 1994, now U.S. Pat. No. 5,565,982.

BACKGROUND OF THE INVENTION

1. Field of the Invention

The present invention relates generally to the resolved spectroscopy and, more specifically, to time-resolved spectroscopy using pseudo-random modulated diode lasers. More particularly, the invention relates to a high time and space resolution system and method in relation with the imaging and characterization of fluoresces sources or optically difused media.

2. Description of the Related Art

Time-resolved optical sensing, such as, fluorescence spectroscopy and near infra-red spectroscopy (NIRS), are well known in the art. Conventional time resolved spectroscopy relies on a high-power, short pulse laser system, which excites the molecular states instantaneously in comparison to slow fluorescent decay or provides an impulse for photon migration within a scattering medium. The short pulse durations in the laser systems are in the picosecond range and a fast data acquisition system is used in measuring the fluorescence of the object scanned with the laser system. Current data acquisition systems have a sufficient resolution and signal to noise ratio; unfortunately, these pulsed systems are in limited use due to their complexity, size, and cost. Generally, the system consists of a high power picosecond laser(s), sophisticated optics, complex electronics and elaborate high speed data systems. The systems are large in size and weight, expensive, and prone to frequent breakdowns in operation, thus requiring the attendance of highly trained personnel. Consequently, there is serious difficulty in using the system for autonomous operation in clinical medicine and biochemical applications.

Phase Modulated Spectroscopy (PMS) is another method used in indirect pathlength resolved NIRS measurement. This method uses modulation-phase-delay measurement, which uses an image intensifier and a mode locked picosecond laser system, over a wide range of frequency variations. This method, however, has several drawbacks. First, the measurement does not provide information on the fluorescent efficiency, which is as important as the fluorescence decay time. Second, the sensitivity of the technique has only one optimum point for a given decay constant, due to the opposite trends between the changes of the modulation depth and the phase angle value as a function of the modulation frequency. Importantly, this method assumes a simple exponential decay of the signal in the interpretation of the data, which is not a trivial assumption for the in-vivo sense applications. When the decay profile deviates from the exponential function, the data cannot be readily resolved to retrieve the true decay profile.

Time-resolved spectroscopy is used to replace more traditional methods of noninvasive medical detection techniques, such as x-rays. Currently, x-ray examinations provide excellent detection techniques in many situations. One such situation is in mammography. X-ray mammography is used for identifying micro calcifications-calcium pockets at the center of tumors, which pockets may be early indicators of breast cancers. Despite its success, however, x-ray mammography has certain disadvantages such as the potential danger from ionizing radiation, the possibility of triggering cancer in tissue cells, and the difficulty of detecting ultra small growths in the early stages. As an alternative to x-ray techniques, non-ionizing approaches, such as near-ir photonics are being used for imaging ultra small tumors of one millimeter or less in size.

Tissue absorption is comparatively low in the red and near-ir spectral region between, about 600 nanometers (nm), where blood absorption falls off strongly, and 1.3 μmeters, where water absorption increases rapidly. Transillumination technique for breast diagnostics has been demonstrated for sometime, but its value has been limited because of strong image blurring due to heavy multiple scattering by the tissue. To make this technique more useful, a number of methods for compressing the scattered light are considered. One such technique is time-gated spectroscopy. In this technique, picosecond laser pulses are transmitted through the tissue and the time gated-photons are detected using a fast optical gate such as a Kerr-cell. This method allows differentiation of three different components of the migrated photons through the tissue: ballistic component, snake-like component, and diffuse component. The ballistic component results from the coherent interference of the light scattered in the forward direction and the photons propagated nearly straight through, thus resulting in the least time delay. The ballistic component always exists, but its intensity is very low. In an inhomogeneous medium, some photons are scattered slightly off the straight line path and zig zag through the medium. This is the snake-like component (quasi-coherent). The diffuse component is the most dominant part of the transmitting photons and the delay is the greatest. Time-gating provides a means of differentiating these components in terms of delay time associated with each component. Currently, this technique has shown to be able to resolve an image imbedded in a highly scattered medium with a resolution up to one millimeter.

Another approach to time-gating the transilluminated photons is the use of frequency-domain measurements, which are well known in the art. In this method, the time delay of the migrating photons are measured indirectly in terms of the mode-locked picoseconds pulse trains in the tissue. This technique has been extensively developed for time resolved fluorescent measurements. However, the measurement results are uncertain in terms of an unusual frequency response curve of the phase angle plot, as well as difficulty in curve fitting the results to a theoretical prediction. This is based on the assumption of exponential decay of the impulse response function, as well as difficulty of unfolding the signature of the nonexponential components of the impulse response function, which is more likely in most of the in-vivo samples of small size.

Accordingly, what is needed as an improved apparatus for time-resolved spectroscopy that does not require the sophisticated optics, complex electronics, or elaborate high-speed data systems of prior time-resolved spectroscopy apparatus. Further, the improved apparatus should be able to overcome the problems associated with the assumption of a simple exponential decay of the signal for any problems associated with back ground lighting existing in pulse systems. Additionally, adverse health concerns to the patient should be reduced while approaching the diagnostic accuracy of the x-ray measurement techniques without resorting to ionization.

SUMMARY OF THE INVENTION

It is therefore one object of the present invention to provide a compact, low-power consumption sensor for fluorescence measurement or time resolved spectroscopy (TRS) measurement.

It is another object of the present invention to provide enhanced time resolution up to a few tens of picoseconds.

It is yet another object of the present invention to provide a time resolved spectroscopic system and method with high time and space resolution in relation to the imaging and characterization of fluorescence sources or optically diffused media.

The foregoing objects are achieved as is now described. According to the present invention, a system and method are provided using digital processing techniques of a low power, continuous wave signal generated by a continuous wave light source, such as a cw laser. Time elapse is determined by measuring the time shift of a reference modulation sequence using the cross correlation of a return signal with the reference signal. The high resolution time delay is introduced at the start of each modulation cycle and the high resolution measurement is constructed by interlacing a data set based on delay information. The high resolution TRS or fluorescence measurement is achieved by correlation calculation of the measured data and the reference code and deconvolving the autocorrelation function of the reference code.

The system is able to perform the enhanced time-resolution spectroscopy measurements by way of a novel data acquisition system. The data acquisition system is based on a personal computer, which initializes the system parameters and then initiates the data acquisition cycle. A pseudo-random code generator, coupled to the personal computer is then reset. A data processing unit programs the number of pseudo-random code cycle summations and also controls the delay generator with a prescribed phase delay. The light wave generator, such as a laser diode, is then modulated by the pseudo-random code and is then transmitted. The transmitted signal is reflected off an object and then is detected. The signal, which is in analog form, is then digitized by a high-speed digitizer with the time integrated data then being stored in a First-In First-Out data memory.

Once the data acquisition is completed, the digital processing unit fetches the data into an internal memory and performs correlation calculations. Meanwhile, a different phase delay is programmed into the delay generator by the digital processing unit, which then initiates the acquisition of the next set of time integrated data. The computer then collects the final correlation results corresponding to the different phase delays. The correlation results are analyzed and presented by the computer. The graphic display of analyzed data can be presented through custom made graphics software using a high-resolution monitor and a fast graphics accelerator. The data can also be stored using various types of mass storage media.

The above as well as additional objects, features, and advantages of the present invention will become apparent in the following detailed written description.

BRIEF DESCRIPTION OF THE DRAWINGS

The novel features believed characteristic of the invention are set forth in the appended claims, The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
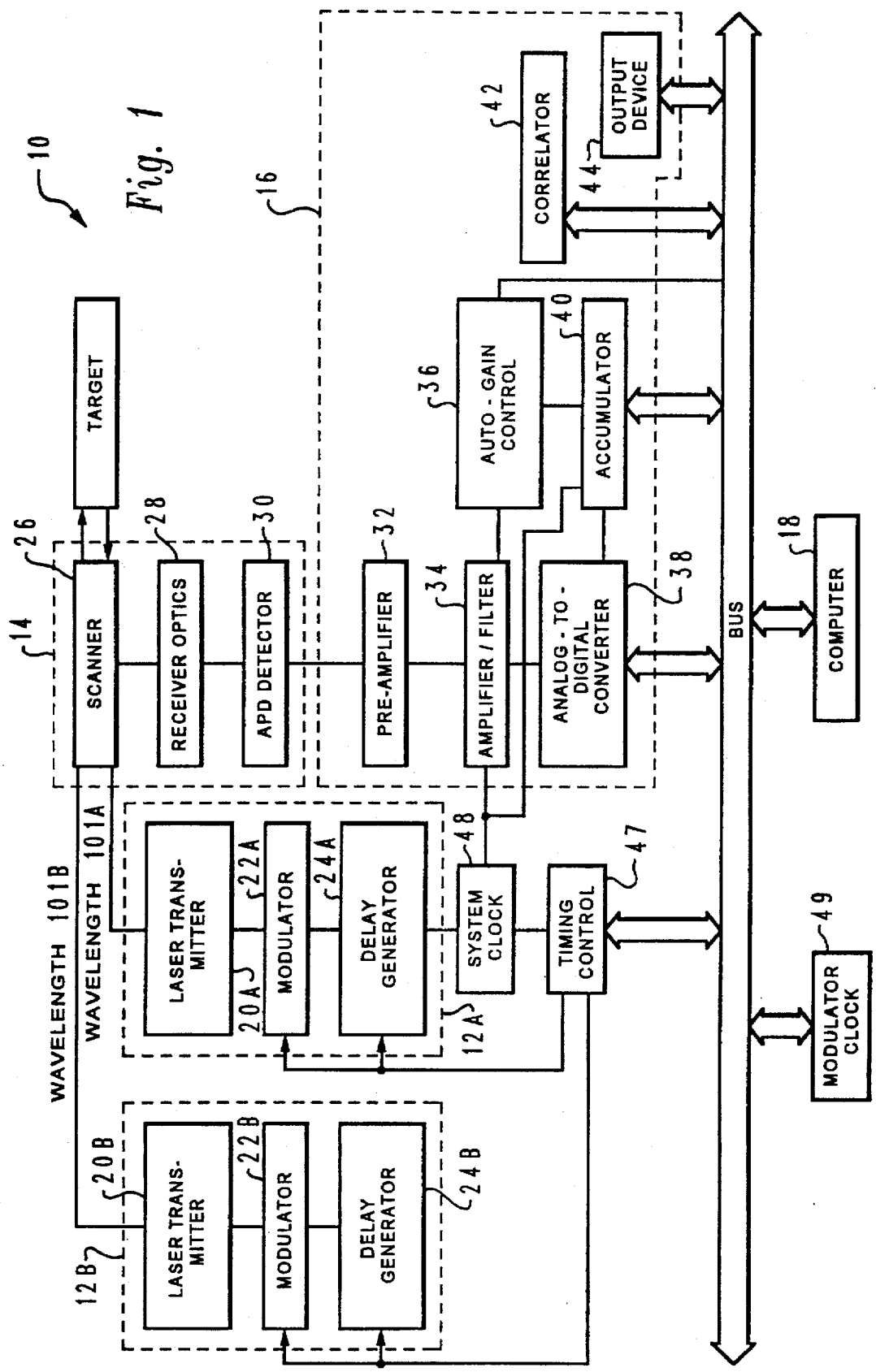
FIG. 1 is a block diagram of the laser-based time-resolved spectroscopy system according to the present invention.

A time-resolved sensor system 10 is illustrated in FIG. 1 and consists of three subsystems: a diode laser transmitter 12, a set of scanner and receiver optics 14, and signal processing electronics 16, which are connected by a BUS line to a computer and data storage system 18.

The diode laser transmitter system 12 further comprises laser transmitter 20, modulator 22, and delay generator 24. The scanner and receiver optics 14 include optics element 26, filter 28, and an avalanche photo detector (ApD) 30. The signal processing electronics 16 further includes preamplifier 32, amplifier 34, automatic gain control (AGC) 36, analog-to-digital converter unit (ADC) 38, accumulator 40, and data processing unit or correlator 42. The computer 18 may be further connected to an output device 44, which may comprise either a video monitor or printer, or both or other display devices. A system clock 46, timing control 48, and modulator clock 50 are also included.

The sensor system 10 typically uses a diode laser as laser transmitter 20, and it is digitally modulated by a pseudo-random code of a preselected length, e.g., 1023 bin, and close to one gigahertz modulation speed employing the modulator 22, to provide one nanosecond time resolution. After a fixed number of modulation periods, defined as a cycle, the modulation start time delay is readjusted, by a prescribed manner using delay generator 24, which provides a phase shift between the cycles, typically on the order of one period (or chip) of the PN code. A transmitter beam from laser transmitter 20 is deflected by scanner 26 to the target. The return signal from the target is deflected by scanner 26 to the receiver optics 28. The return signal is then measured by an avalanche photo detector 30 and preamplifier 32, to provide a low noise electrical signal. This electrical signal is then further amplified and filtered by amplifier/filter unit 34. The gain of the amplifier/filter 34 is automatically adjusted to provide a proper signal for the analog-to-digital converter (ADC) 38 by the automatic gain control (AGC) unit 36. The dynamic range of the ADC 38 can be very low due to the specific features of the signal processing routine disclosed below whereby the output from the ADC 38 is first summed at the accumulator 40. After the data has been accumulated for a preselected number of cycles, the time integrated digital signal from the accumulator 40 is read into the correlator 42 for calculating the correct correlation values, deconvolution of the reference code autocorrelation, and time resolved fluorescence or scattering measurement.

Figure 2:
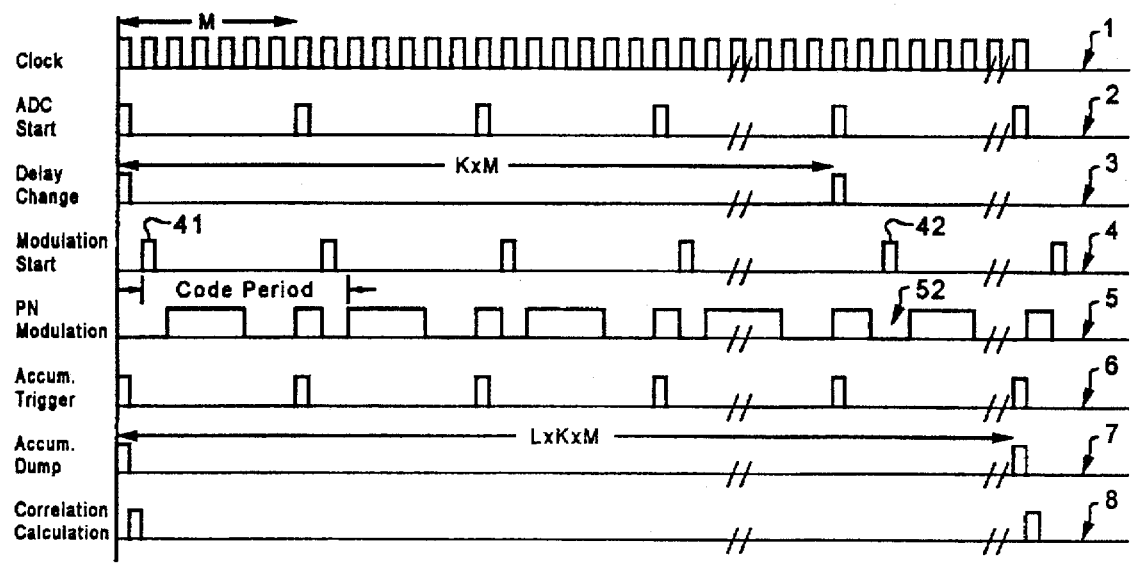
FIG. 2 is a timing diagram of the sensor depicted in FIG. 1.

FIG. 2 depicts a timing diagram of how the sensor system operates to perform measurement. System clock 46 provides a modulation speed of up to one gigahertz and is shown in line 1. The timing for the analog-to-digital converter is shown in line 2 and triggered at the start of the first clock cycle and is retriggered every clock cycle. The modulation start time delay, shown in line 3, is also triggered at the start of the clock 46 and continues for a period of M×K, where K is equivalent to the multiple of the code cycle with a given delay. Then, the modulation start time, shown in line 4, is readjusted by delay generator 24 to provide a phase shift between the cycles, typically on the order of one period, of the PN code. A typical PN modulation train is illustrated in line 5. Once the return signal is being accumulated, accumulator 40 is triggered, as shown in line 6, each time the analog-to-digital converter 38 is triggered. Just after the accumulator 40 is triggered, the accumulator dump cycle, which is shown in line 7, lasts for a period of L×K×M period, where L is equivalent to the number of delay required to span one chip. The correlator is triggered in line 8, to begin correlation and is completed just after the end of the accumulator dumping cycle.

The sensor system 10 measures time-resolved optical signals, such as fluorescence or photon migration signal, with sub nanosecond resolution using continuous wave (CW) pseudo-random modulation-correlation technique (PRM). One type of light source are commercially available diode lasers, such as for example, near infrared (IR) or red diode lasers. The measurement system for fluorescence uses blue diode lasers as the light source. The sensor system 10 is capable of time resolved measurements with 50 picosecond time resolution and sensitivity of the photon counting system. System 10 uses a moderate processing speed and the time resolution enhancement technique to achieve the subnanosecond time resolution. The method of using pseudo-random modulation (PRM) correlation is based on a similar PRM correlation method as described in pending U.S. patent application Ser. No. 07/926,056, filed Aug. 6, 1992 now abandon, herein incorporated by reference for all purposes. The PRM correlation system that is used in sensor system 10 provides time evolution of the signal by the continuous operation of a CW laser. The transient time characteristic of the signal is measured by invoking the cross correlation calculation and determining the amplitude of the correlation signal for varying time shifts. This is a method of measuring the temporal behavior of the Weak signal buried in a random noise background. The sensitivity of this measurement is likened to that of the phase sensitive detection technique of differential signal measurement. The PRM correlation technique is the generalized form of the phase sensitive technique, in which the signal-to-noise ratio is progressively improved by integrating the signal for a long period. A problem associated with pulsed systems is that there is unwanted background light. This is overcome in the PRM correlation method and the minimum signal level obtainable by PRM correlation is smaller than that of the conventional high power picosecond laser system of the prior art.

Although the fluorescence or photon migration sensor system 10 of the present invention will be described below with application to medical diagnostics, it is understood that the applications of the techniques according to this invention are also applicable in the biochemical, minerals and petroleum exploration, and environmental fields. Specifically airborne configurations of the sensor can provide a powerful tool for remote sensing of atmospheric gases of importance for environmental-monitoring as well as petroleum and minerals exploration.

A diode laser has the advantages of small size and the amenability of intensity modulation by the drive current, the combination of the PRM modulation with the diode laser transmitter results in a compact sensor system. Diode lasers are much less expensive than other laser systems. The wavelength of diode lasers are available across near-IR and red spectra. Diode lasers are tunable and the technique of frequency doubling or up conversion lasing technique provides for a wide range of frequency selectability not found in conventional pulsed laser systems. The sensor system is suitable for remote, nondestructive measurements as well as in-vivo measurements, with equally high sensitivity. The measurements obtained by sensor system 10 discriminate the background radiation as well as other frequency components of noise quite effectively; therefore, it is possible to operate the system autonomously in a noisy environment. The addition of a computer 18 allows the system to produce a real time image of the measured signal.

The PRM correlation method used in system 10 uses the delta function property of the autocorrelation function of a pseudo-random code. The output of laser transmitter 20 is modulated by a maximal sequence PRM code produced by modulator 22. The fluorescence signal from a sample (not shown) is then digitized with a low bit resolution and averaged for M cycles of the PRM sequence. Cross correlations of this signal with the original transmitter code are then calculated for each of the N time bin shifts, which cover the entire code length. In other words, the signal is digitized at a rate of N×M per second. Due to the delta function property of the PRM code, the cross correlation is always zero except in the case of a null phase difference between the transmitted code and the received code. A null phase difference is realized for the time shift corresponding to the time delay of the fluorescence signal from the excitation laser modulation. Accordingly, the correlation values for a fluorescence signal decaying exponentially with a time constant of $\tau$ will have the same exponential decay as the fluorescence intensity decay; thus, the correlation decay is a direct replica of the fluorescence intensity decay.

The pseudo-random code is based on a cyclic, digital (1 or 0) Nth order PR code represented by $a_i$. The cross correlation $\rho_h$ of this code with another expression of PR code $a_j'$ with elements 1 and $-1$, in place of 1 and 0, will then satisfy the following relationship:

$$\rho_j = \sum_{i=0}^{N-1} a_i a_{j+i}' = \begin{bmatrix} (N+1)/2 & \text{for } j=0 \\ 0 & \text{for } j \neq 0 \end{bmatrix}$$

The return signal, $s_i$, acquired at the receiver is the convolution of the transmitter signal, $x_j = Pa_j$, and the impulse response function (IRF) $R_j$, thus $$S_i = \sum_{j=0}^{N-1} Pa_{i-j} R_j + b$$

where b represents the background and noise signal, and P stands for the diode laser power. If the data acquired is accumulated for M periods of PRM code cycle, the integrated signal, S, is $$S_i = \sum_{k=1}^{M} S_{i+kN}$$

It is observed that the photon counting detection technique is well suited for the detection of the small signal due to the digital summing nature of the integrated signal.

The IRF decay profile is then derived by taking the cross correlation of the return signal with the PRM code signal which is shifted by $l$ time steps relative to the original modulation as $$\rho_l = \sum_{i=0}^{N-1} S_i a_{i-l}' = M \left[ P \cdot \frac{(N+1)}{2} \cdot R_l + b \right]$$

where $l=(t/\Delta t)$, the number of modulation shifts corresponding to the time delay t of the fluorescence emission from the laser excitation, and $\Delta t$ is the modulation time step. Thus, $$R_l = \frac{2(\rho_l/M)}{P(N+1)} - \frac{b}{P(N+1)}$$

Since b is an uncorrelated noise signal, the correlation with a' is close to zero. However, a property Of the modulation sequence is that the number of ones in a sequence always exceeds the number of zeros by one. Therefore, the background term b cannot be neglected for excessively noisy data. A long code of over 1,000 bins is used to suppress the effect of the background. In this way, the remaining background signal magnitude becomes many orders of magnitude smaller than the correlation value of the return signal. A modulation code which corrects this defect, can be readily implemented by flipping the sign of a given code and combining it with the original code serially. In this way the 1's and 0's of the modulation in the code become the same number and thus effectively cancels the correlation bias. In addition, the detector signal is dc-coupled to filter out the dc-component of the background signal.

There are important characteristics of the PRM code in relation with the application to the correlation measurements. The first and most important characteristic of the PRM-correlation technique is the pseudo-random property and the delta function like correlation property of the code. The physical implication of the property is that the correlation value will be non-zero only when the cross product is made with itself with no phase shift. Naturally, waveforms other than the given PRM sequence will produce null correlation value no matter what the waveform is. Thus, the PRM-correlation technique can be considered as an n-phase phase-sensitive technique, in contrast to the conventional bi-phase phase-sensitive technique. Therefore, the noise filtering property is the same as in the bi-phase lock-in amplifier system. The PRM Correlation technique is the most general case of the phase sensitive technique.

Another important characteristic of the PRM-Correlation technique is the commutative property of the correlation operation and summing operation. This property provides substantial convenience in the data processing and the time integration of the signal. Due to this property, the signal averaging in the correlation coefficient of each code length is equal to the correlation of the time averaged signal. Thus, the lengthy correlation operation of the signal becomes a one-time calculation with the time averaged signal. Therefore the data processing becomes a simple operation that can be readily implemented in a real-time system.

The diode laser output may be modulated much faster than a few gigahertz (GHz) and the signal processing speed permits a high speed system, but the signal-to-noise ratio decreases as the modulation speed increases. In view of this limitation, it is preferred that the modulation be limited to a few hundred megahertz for a standard system. The modulation speed of the laser transmitter need not be very high as long as the bandwidth of the modulation waveform is maintained high enough and the detector bandwidth large enough so that the fluorescence/photon migration decay may be well resolved regardless of the modulation speed. For example, a subnanosecond decay may be readily measured using the laser modulation of one gigahertz or less if the detector bandwidth is over one gigahertz.

Temporal resolution is further improved by introducing a prescribed timing shift with respect to the digitizer trigger signal at the start of each code sequence, then interlacing the data sequences to form a contiguous high sampling rate data set. This improves the time resolution of the correlation measurement up to the limitation of the time delay precision, which may be less than 50 picoseconds, and without compromising the detection sensitivity, which is governed by the laser transmitter modulation frequency. The triangular autocorrelation profile of the thus formed reference modulation is then deconvolved from the measurement correlation profile to extract the true time resolved signal of the measurement system. This method enhances the time resolution without compromising the detection sensitivity that is governed by the laser transmitter modulation frequency. This further simplifies the engineering challenges of the system implementation for high speed fluorescence/photon migration decay measurements.

The sensor system 10 measures the fluorescence/photon migration signal received from an irradiated sample by using a relatively fast laser modulation and digitizer as compared to the fluorescence/photon migration decay time. The received signal is then correlated with the digital code waveform to obtain the correlation coefficient decay. Signal averaging and noise reduction are implemented by folding the continuously modulated signal at each start of the code and correlating the resulting time integrated data set with a given PRM code, but not by averaging each correlation decay from single modulation data. The system corrects the correlation waveform droop, which is due to the system response, by employing the laser transmitter modulation waveform measured by the same AC-coupled detector as the reference code for the correlation calculation. The measured modulation waveform works as an ad-hoc reference code and corrects the distortions in the correlation plot. The temporal resolution enhancement method is also applicable or functional when the fluorescence/photon migration decay is fast in comparison to the modulation speed.

Figure 3:
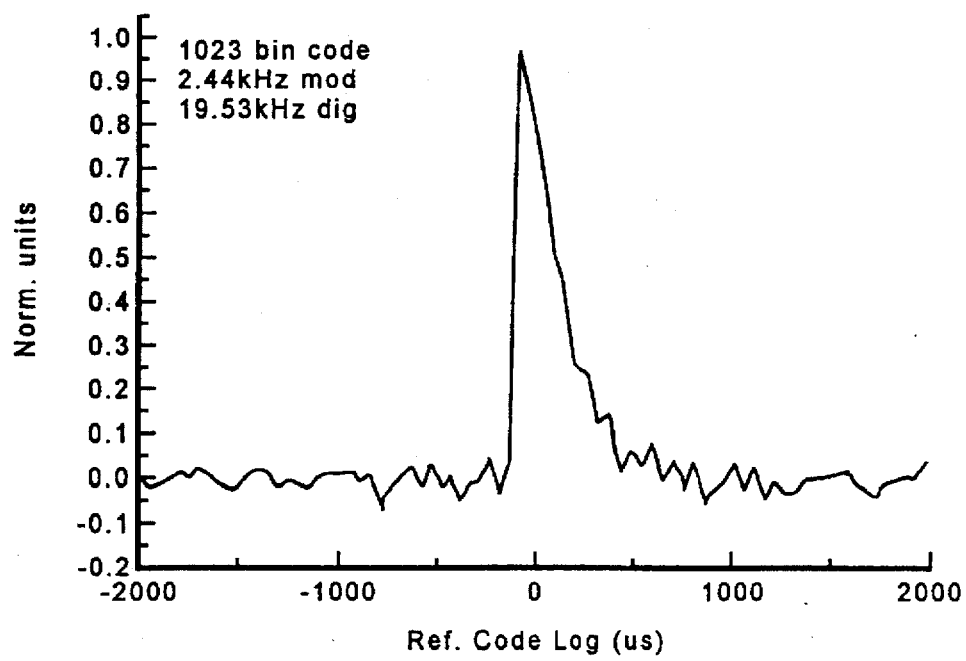
FIG. 3 is a graph of a measurement made by the sensor of FIG. 1.

In either case, the fluorescence/photon migration decay is then extracted from the data curve by taking the correlation with the reference modulation code as depicted in FIG. 3. A significant retrieval of the fast decaying fluorescence/photon migration signal is observed in this graph. The decay time of 178 microseconds is then measured by a numerical curve fit in semi-log space using the portion of the decay profile. The method achieves a reasonably accurate portrait of the processed decay time obtained by the resolution enhancement technique as compared to the true decay time, thus confirming the accuracy of this time resolution enhancement method.

The sensor system 10 may be used in detecting photon migration, which is then correlated with the same reference code.

The operation and subsystem requirements of sensor system 10 are outlined in table 1.

TABLE 1

| | |
|---|---|
| Laser | Diode Lasers |
| Wavelength | 670 nm, and Doubled 800 nm |
| Power | ≈200 mW |
| Beam Divergence | <1 mrad |
| Time Resolution | 50 psec; Variable |
| Modulation | M-sequence PRM Modulation |
| Clock Time | dt = 2 nsec, 500 MHz |
| Code Length | N = 1023 ($2^{10} - 1$) |
| Code Period | 2 µsec–100 µsec |
| Receiver Optics Telescope | 2" dia lens |
| Optical Filter | Color filter or ir filter |
| Detector | |
| SiAPD | |
| Quantum Efficiency | 0.6 |
| Excess Noise Factor | 9 |
| Preamplifier | Trans-Impedance |
| Signal Processor | |
| ADC | 8 bit |
| Computer | Dedicated Micro-computer |
| Signal Integration | Variable |
| Correlator | DSP & DFT |
| Display | Color Graphics |

Diode laser 20 is digitally modulated by a pseudo-random code from modulator 22. The pseudo-random code has a given length, for example, 1,023 bins, but may range from between tens of bins to over several thousand bins, and a two nanosecond modulation time bin width.

A diode laser of AlGaAs, with a wavelength range between 750–820 nanometers, is used in a standard system and is applicable for both photon migration and fluorescence sensor systems. Alternatively, a blue LED having a wavelength of approximately 470 nanometers may be used instead of the AlGaAs diode laser. A blue diode laser may also be an alternative light source and is especially suited for the fluorescence sensor system. Another light source includes a MOPA system or a tunable solid state laser (LiCAF).

The transmitter beam from any of the diode lasers is collimated to less than a milliradian divergence to achieve the preferred angular resolution. The background suppression during operations is achieved using a combination of dichroic and IR band filter with an optimum filter width of a few nanometers, which is based on the fluorescence emission spectrum or photon migration spectrum, typical background level and receiver FOV, as well as the diode laser power.

The receiver optics 28 uses a two inch diameter optics since the transmitter uses approximately 200 milliwatts of power and the pseudo-random modulation is set on a one nanosecond time bin. This provides high sensitivity for laboratory fluorescence measurement. The sensor need not be a differential sensor, thus a large dynamic range digitization is not necessary. Any small signal may be enhanced by the accumulation of data, since the random noise component is suppressed by the PRM correlation method. The receiver optics uses an adjustable field of view (FOV) (not shown) by means of a field stop to provide high spacial resolution as well as reduction of background signal.

In the alternative, a Fourier transform image plane may also be formed at the focal length of the primary receiver optics. By adjusting the field stop size located at the Fourier image plane, judicious selection of the angular components of the reflected light may be accomplished to discriminate further the multiple scattering component. A broad sample area may also be scanned for two dimensional coverage.

This arrangement leads to the use of multi-element detector array systems, which may be used instead of the single element system, to generate a topographic image of a decay constant or a three dimensional (3D) absorbance image.

Figure 4:
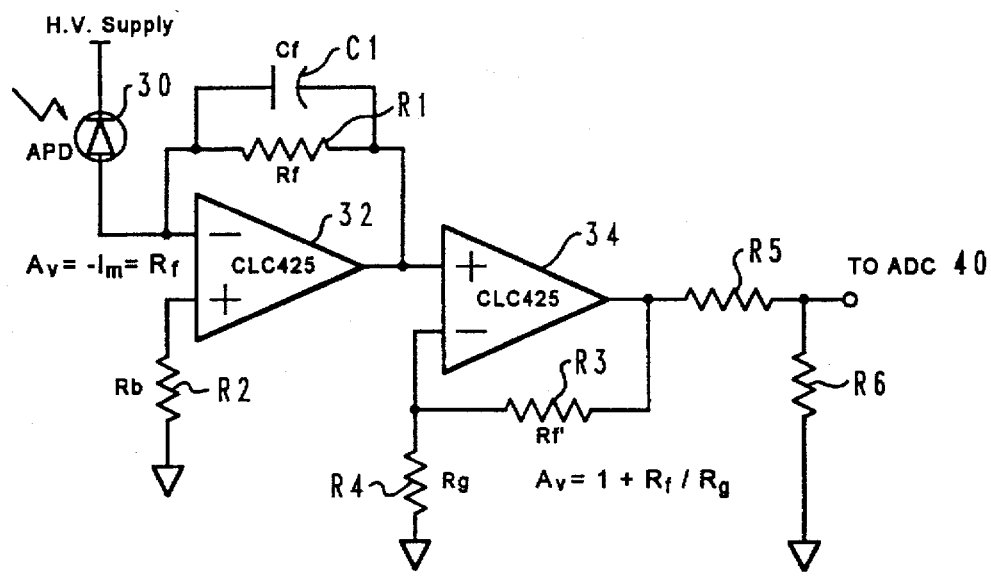
FIG. 4 depicts a schematic diagram of the detector, preamplifier, and amplifier units as illustrated in FIG. 1.

APD detector 30 uses high speed avalanche photo detectors having a bandwidth as high as 2–3 gigahertz with small size detector elements. Signal loss is limited by the small sized detector because the FOV of the fluorescent signal receiver is very small and the optics lenses are of sufficient quality to avoid signal loss. APD detector 30, which is further connected to preamplifier 32, includes an electronics subsystem illustrated in FIG. 4. APD detector 30 has a spectral response range from 350–1,050 nanometer wavelength. An InGaAs APD device may also be used and has a response characteristic above the 1,000 nanometer wavelength. The APDs are available from Hamamatsu, RCA, Mitsubishi, and AT&T. For example, AT&T manufactures an APD No. 115A/B ASTROTECH InGaAs having a wide bandwidth of at least 1.8 gigahertz and extremely low leakage current.

The APD detector 30 is connected to a low noise transimpedance preamplifier 32. Preamplifier 32 is followed by a voltage gain amplifier and filter 34, which has high gain current feedback and does not reduce much on the overall bandwidth. The transimpedance gain of amplifier 30 is set by R1, which is coupled across the negative input and the output of preamplifier 32. The gain flatness and bandwidth is determined by capacitor C1, which is coupled in parallel to resistor R1. The gain of preamplifier is set as low as possible to maintain the wide bandwidth. The positive input lead on amplifier 34 is connected to the output of preamplifier 32. The positive input of preamplifier 32 is connected to resistor R2, which is further tied to ground. Resistor R2 is a variable resistor that adjusts the gain of amplifier 34. Signal conditioning, which is optional, is employed to prevent aliasing of the high frequency components during sampling process. The detector 30 has a bandwidth limit of about two gigahertz and the digitizer samples at 500 megahertz. An automatic gain control (AGC) amplifier (not shown) is added after the post amplifier, if there is a problem with limited bandwidth in phase distortion. The output of amplifier 34 is fed back to the negative input for gain control through resistor R3 and R4. The final output of the amplifier 34 is sent to the ADC 40 after passing through resistor divider R5 and R6.

The amplifiers 32 and 34 are high speed operational amplifiers and are available from Comlineary and Harris Semiconductor. For example, the Comlinear ultra-low noise Op Amp CLC425 offers a 1.7 gigahertz gain bandwidth. Additionally, the design uses low impedance components such as chip resistors and chip capacitors. Additionally, since this is a high frequency circuit layout, the power supply and ground traces are to be kept away from the inverting input and output pins; otherwise, parasitic capacitants at these nodes to ground cause frequency response peaking and possible oscillation.

The concept and support for modulator 22 of FIG. 1 is now given. Modulator 22 is a pseudo-random modulator that uses a set of linear feedback shift register generators to generate pseudo-random codes. In one embodiment the standard code length is N=1,023 ($2^{10}-1$), a fixed length N-bit pseudo-random number (PN) code modulator is implemented with the feedback shift register. In an alternative embodiment, a maximal length shift register may also be made for more than two exclusive-OR (XOR) feedback taps. When more than two feedback points are used, the delay inherent in the feedback loop is additive and the net delay becomes the sum of all the propagation delays in the path from the last stage 1 to the first stage 1. The feedback delay path limits the maximum useful speed of the sequence modulator. The $1+X^m+X^l$ polynomial configuration reduces the delay inherent in the feedback path. The code length N is determined by $N=2^l-1$, for a given I. In some cases there is more than one possibility for m and I-m can be used instead of m. The variable length PN code generator may also use high-speed programmable array logic (PAL) devices, but its operating bandwidth is limited. Thus, for 500 megahertz modulation implementation is preferred to use the ECLinPS fast logic component to implement a large bandwidth; however, this circuit requires much more power compared to a circuit with PAL chips. Variable (multiple) length PN code modulation requires extra logic levels in the feedback path.

Figure 5:
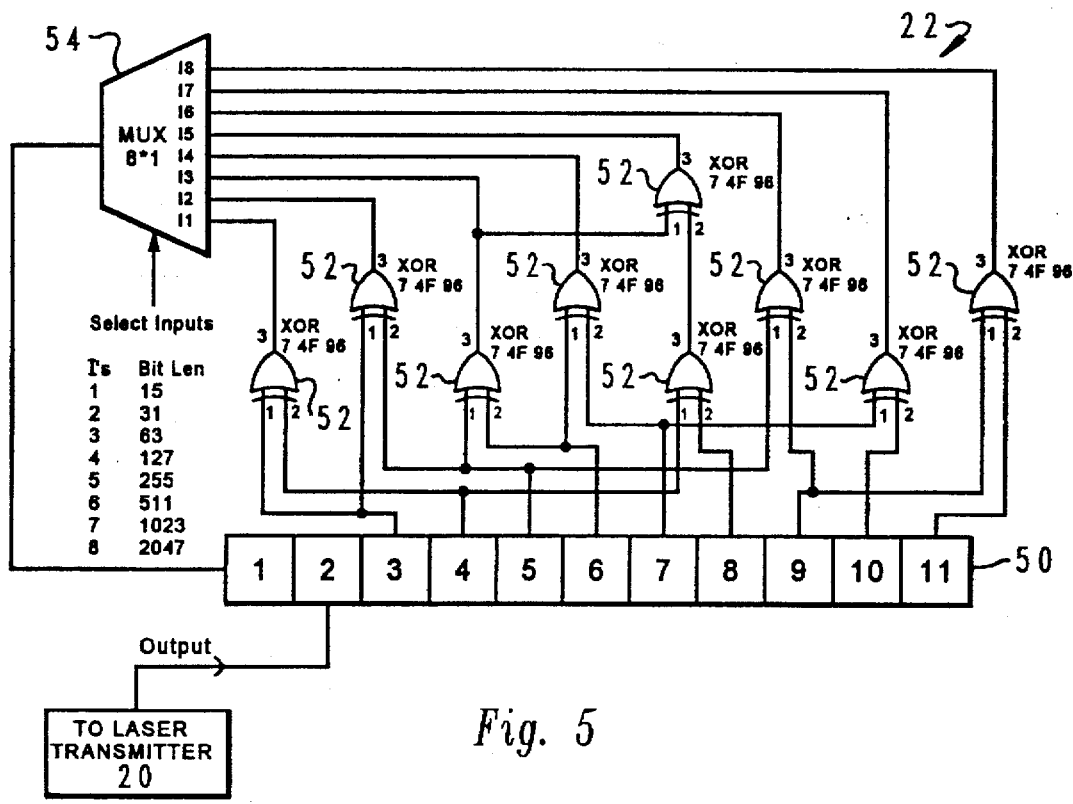
FIG. 5 is a schematic diagram of a multiple length pseudo-random code generator as shown in FIG. 1.

FIG. 5 depicts a schematic diagram of a fast PN code modulation logic design using a linear feedback shift register 50. Feedback shift register 50 includes eleven subregisters, nine of which are further coupled to at least two XOR gates 52. For example, subregister 3 is connected to the first and second XOR gate 52, while subregister 4 is connected to the first and fifth register. Each XOR gate is further connected to a multiplexer 54, which is an eight-bit multiplexer having an output to the first of register of feedback shift register 50. Subregister 2 of feedback shift register 50 provides output to the laser driver or transmitter 20. In this design, each clock cycle has a two nanosecond period and the feedback path propagation delay is less than two nanosecond. The worst, or longest, propagation path is two XOR gates and one multiplexer. Each XOR gate 52 has a propagation delay time of about 530 picoseconds and multiplexer 54 has a delay time of about 620 picoseconds. The total feedback path propagation delay is approximately (2×530)+620=1680 picosecond and there is a 320 picosecond setup time available for the feedback signal to the first stage of the shift register 50. The PN code length can be controlled by selecting one of the feedback registers from the multiplexer inputs. Efficient PC board design is necessary to control the modulator speed. The high frequency performance of the sequence modulator 22 and driver depends upon the amount of care taken in designing the PC board. Therefore, it is important to use low inductance components such as chip resistors and chip capacitors where possible.

Figure 6:
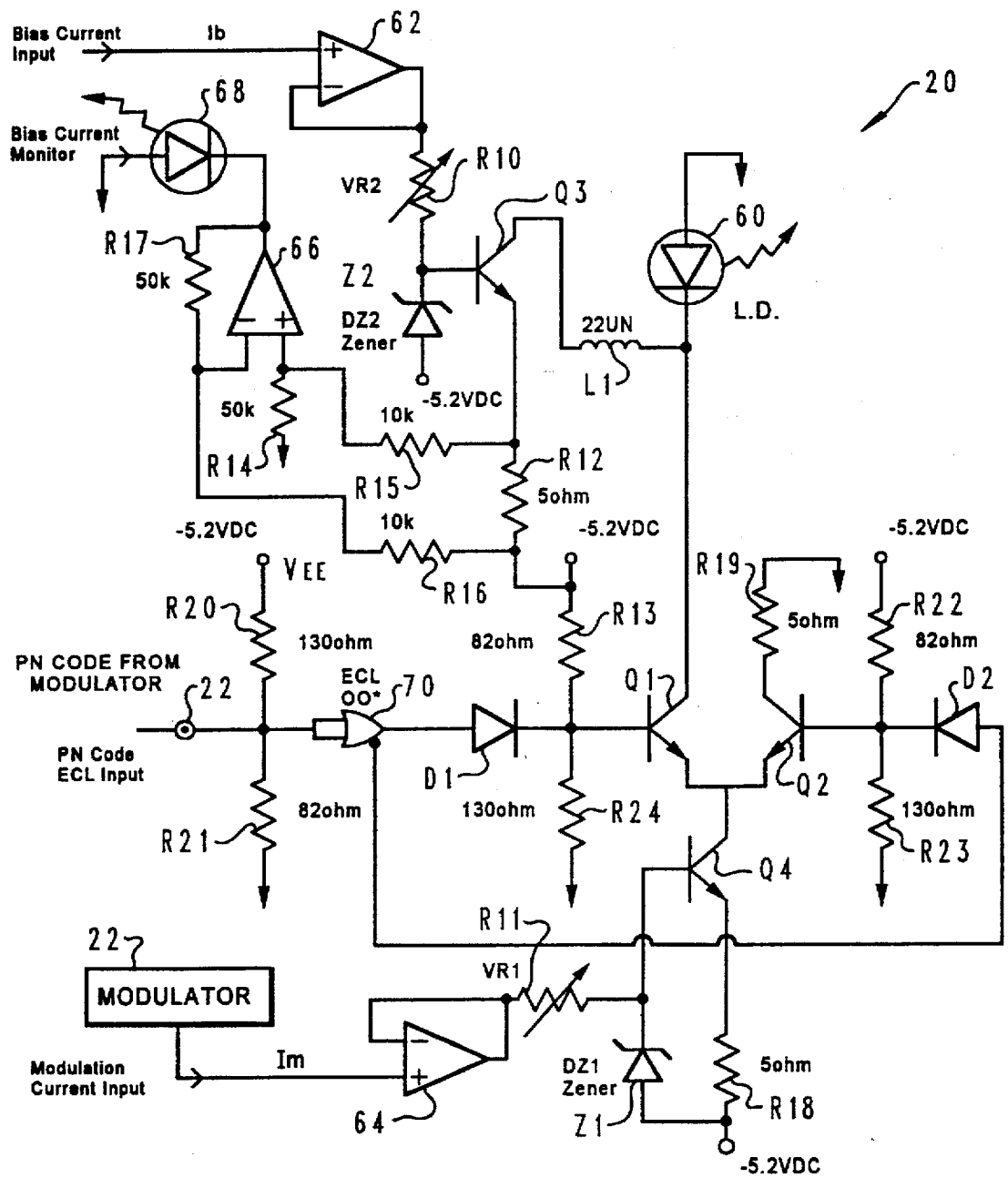
FIG. 6 depicts a diagram of a schematic laser diode driver circuit in form as shown in FIG. 1.

Laser transmitter 20 is shown in greater detail in schematic FIG. 6. Laser transmitter 20 is comprised of laser diode 60, bias current control amplifier 62, modulator control current amplifier 64, bias current operational amplifier 66, emitter coupled transistors Q1 and Q2, zener diodes Z1 and Z2, bias current monitor diode 68, diodes D1 and D2, and variable resistors R10 and R11.

The output power of the laser diode 60 is linearly proportional to the input bias current $I_b$ above a given threshold value of, for example, 50 mA. The laser diode 60 may be operational under either CW or pulse conditions, depending upon the input current $I_b$. Higher modulation depth improves the signal-to-noise ratio of the system; therefore, a fast switching current supply driver is preferred to provide near 100% modulation depth of laser diode 60 output power. The specific embodiment illustrated in FIG. 6 uses ECL logic modulation and input control for controlling and switching laser diode 60. A PN code signal from modulator 22, in ECL logic, is inputed through control gate 70 for controlling the switching mode of emitter coupled transistor Q1 or Q2 or both. The on/off stage of transistor Q1 determines the on/off laser modulation. The modulation current $I_m$ is controlled by modulation input voltage and is calibrated with the variable resistor R11.

The laser diode bias current $I_b$ is controlled by the bias input voltage on amplifier 62 and is adjusted with the variable resistor R10, at a threshold level or other desirable level. Zener diodes Z1 and Z2 are used for limiting the power to laser diode 60. When transistor Q1 is off, laser diode 60 is biased with current $I_b$; when the transistor Q2 is on, laser diode 60 is modulated by the combination of modulation current $I_m$ and bias input current $I_b$. A photodiode 68, coupled to operational amplifier 66, monitors the laser diode light output. This circuit design is capable of modulation frequencies up to 1.0 gigahertz. The collector of transistor Q1 couples to one end of laser diode 60, which has its other end tied to ground. The base of transistor Q1 is tied to the PN code ECL logic input through diode D1 and ECL control element 70. The base of Q1 is further tied to the emitter of transistor Q3, which acts to control the bias current of laser diode. Resistors R12 and R13 are serially coupled between the emitter of Q3 and the base of Q1.

The output of amplifier 62 is tied to one end of variable resistor R10, which has another end tied to the base of Q3. Zener diode Z2 has one end coupled to the base of Q3 and another end tied to the $V_{EE}$. A feedback line from the output of amplifier 62 is tied back to the negative input thereof, and the input bias current $I_b$ is connected to the positive lead of amplifier 62. The collector of transistor Q3 is coupled to an inductor L1, which has another end coupled to or between one end of laser diode 60 and the collector of Q1. Inductor L1 provides surge protection for the laser diode. The bias current monitor circuit not only comprises amplifier 66 and photodiode 68, but further includes resistors R14, R15, R16, and R17. R14 connects one end to ground and another end to the plus lead of amplifier 66. R15 connects one end to the Emitter of Q3 and another end to the positive input of amplifier 66. R16 couples one end to or between resistors R12 and R13 and another end to the negative input of amplifier 66. R17 couples across the negative input of amplifier 66 and the output thereof. Photodiode 68 has one end coupled to the output of amplifier 66 and the other end coupled to ground.

The modulation current portion of the laser transmitter 20 has the current $I_m$ tied to the positive input of amplifier 64, with the output thereof tied to one end of R11 and also fed back to the negative input of amplifier 64. The other end of resistor R11 is tied between one end of diode Z1 and the base of transistor Q4. Transistor Q4 has its collector tied to both emitters of transistors Q1 and Q2 and its emitter tied to one end of resistor R18. Transistor Q4 serves as a constant current source. The other end of resistor R18 is tied to $V_{EE}$. Transistor Q2 has its collector tied to resistor R19, which is further tied to ground. The base of Q2 is coupled to one end of diode D2, which has its other end coupled to ECL controller 70. Resistors R20, R21, provide ECL logic input level and R22, R23 provide voltage translation to Q2. R13 and R24 also provide voltage translation to Q1.

Figure 7:
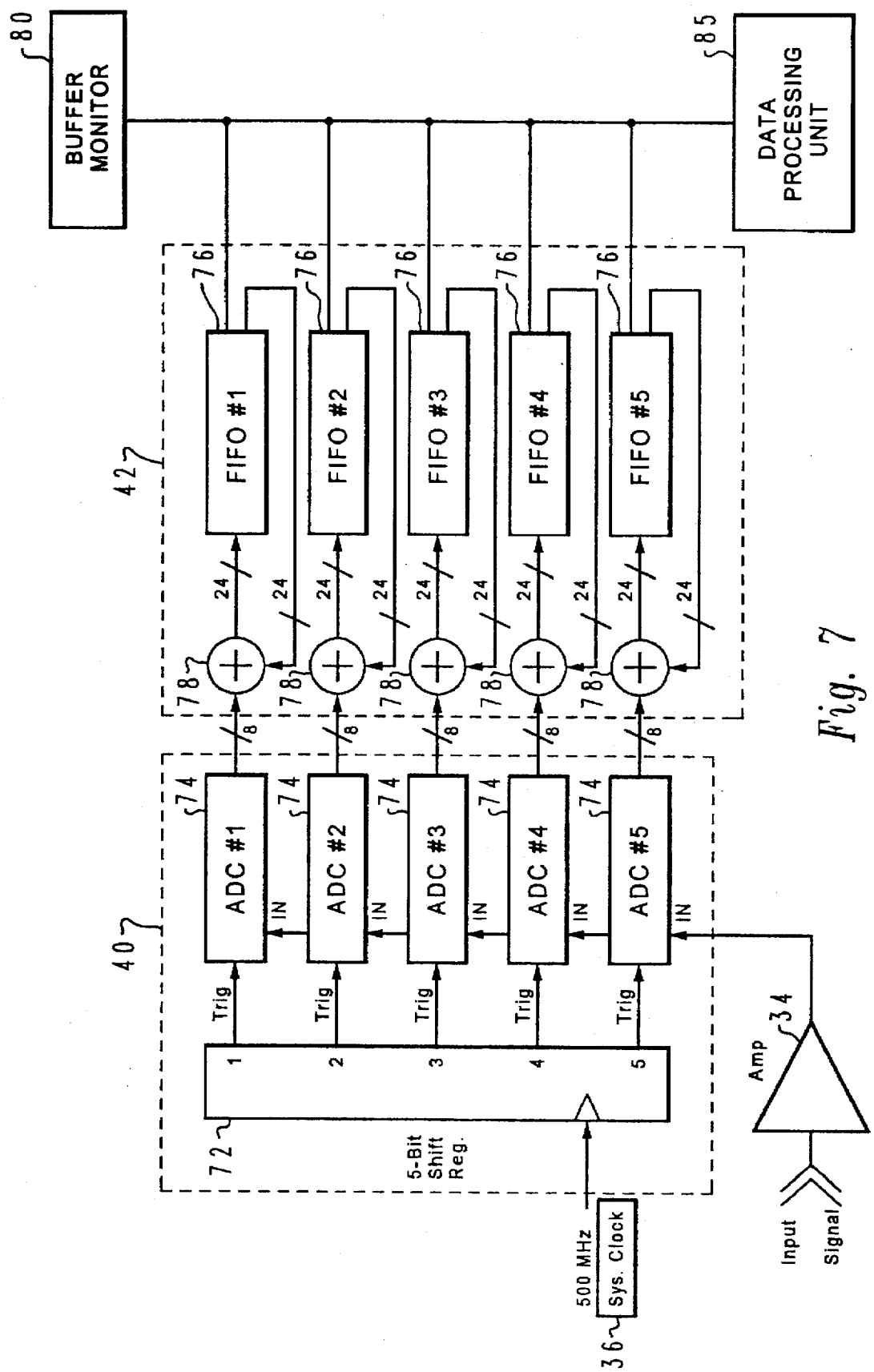
FIG. 7 is a schematic diagram of the analog-to-digitizer circuit with the data accumulator of FIG. 1.

FIG. 7 depicts a schematic of digitizer ADC 40 and accumulator 42. The buffer digitizer ADC 40 uses a 500 megahertz oscillator from system clock 48. The oscillator clocks a five-bit circular register 72 to shift one bit in each clock cycle. Only one bit of the shift register is set to "1." The five-bit register 72 is further connected to five multiplexed high speed sampling or flash analog-to-digital converters 74. Shifting one bit signal initiates one of the five corresponding ADCs 74 to sample the input signal from APD detector 30 and preamplifier 32, which signal is amplified by amplifier 34. The shifting one-bit, which rotates around the shift register 72, directs the five ADCs 74 to sample sequentially and cyclicly; at the same time, the data of the nonsampling digitizer are processed. Once data acquisition starts, the shift register 72 is then cleared, which means that no ADC 74 is to be triggered to start data conversion.

Each ADC 74 is coupled to accumulator 40 via a separate eight-bit wide bus and is associated with a first in first out register (FIFO) 76. The data are sorted into each of their respective FIFOs 76. The time integrated data in each FIFO 76 memory, with N data words in each, is fetched into a data processing unit 85. Since each five averaging FIFOs 76 contains N data points, five of the same integrated elements are to be grouped and summed through summing node 78 associated with each FIFO 76. Once processing is completed, there are to be an array of N elements holding time integrated data in accumulator 42.

Each ADC 74 has an eight bit resolution capability, and each FIFO 76 is an accumulable buffered memory with 2,048 words by 24-bit wide. The average PN code length is 2,047 bit, but may be expandable to a 4K-1 length. Since the digitized input is eight bits, the 24 bit buffer memory can accumulate at least $^{(24-8)}=2^{16}$, or 64K data cycles, before overflow. Accordingly, five FIFO memory banks provide acquisition time for more than 5*64K PN code cycles. For instance, a 1,023-bit PN code length has the maximum acquisition time of 1,023*5*64K*2 nanosecond or 0.67 second. The system also has a FIFO buffer monitor 80 to prevent data overflow.

Each FIFO 76 is compatible with 10KH ECL logic, which provides high speed performance, but with high power consumption. In an alternative embodiment, each FIFO may be replaced with a fast access/write time ECL RAM, which consumes less power. The high speed ECL memory components are available from such suppliers as, for example Motorola, Cenergy Semiconductor, or Cyper Semiconductor. Each ADC 74 is a flash RAM, which samples an input signal sequentially at two nanosecond intervals. Only one flash RAM ADC is active at a given time. The flash ADC does not require a sample and hold circuit to convert the analog signal into a constant voltage over the gating-time interval, which otherwise increases data conversion period. Each component of the digitizer accumulator circuit is capable of processing data at a minimum speed of 200 mega samples per second (MSPS) with an eight-bit resolution. The flash ADC input outputs are ECL compatible with other system components to enable high speed data processing. The multiplexed sampling scheme provides a total of 5*2= 10 nanoseconds for the data accumulation and other processing logics.

Figure 7A:
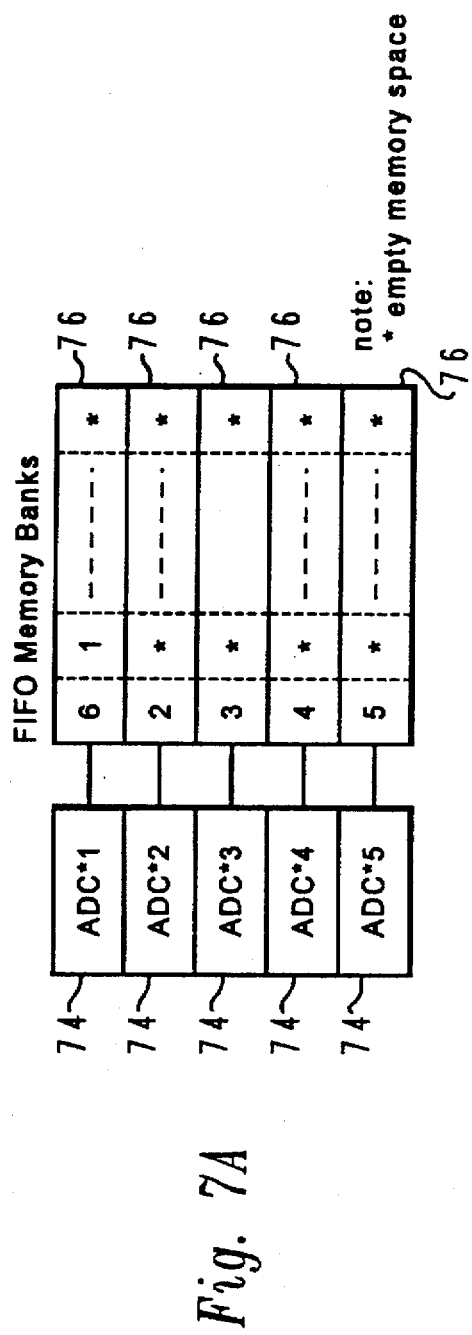
FIG. 7A is a block diagram of the first six analog to digital converter (ADC) cycles of FIG. 7.

Once digitizer ADC 38 starts to acquire data, it programs the five flash ADCs 74 to sample the input analog signal sequentially. Each flash ADC 74 pushes the data over to its associated FIFO 76, which functions as a serial data memory, immediately after sampling. The first clock cycle triggers the first ADC 74 (ADC 1) to sample data and then pushes the first data word onto its associated FIFO 76. A second trigger pulse activates second ADC 74 (ADC2) and the cycle is repeated through the third through fifth ADCs 74 (ADC 3–5). After the last or fifth ADC 74 samples the fifth data, the digitizer 40 cycles back to the first ADC 74, which continues to sample data and pushes a second data word onto its FIFO 76 as is illustrated in FIG. 7A.

Figure 7B:
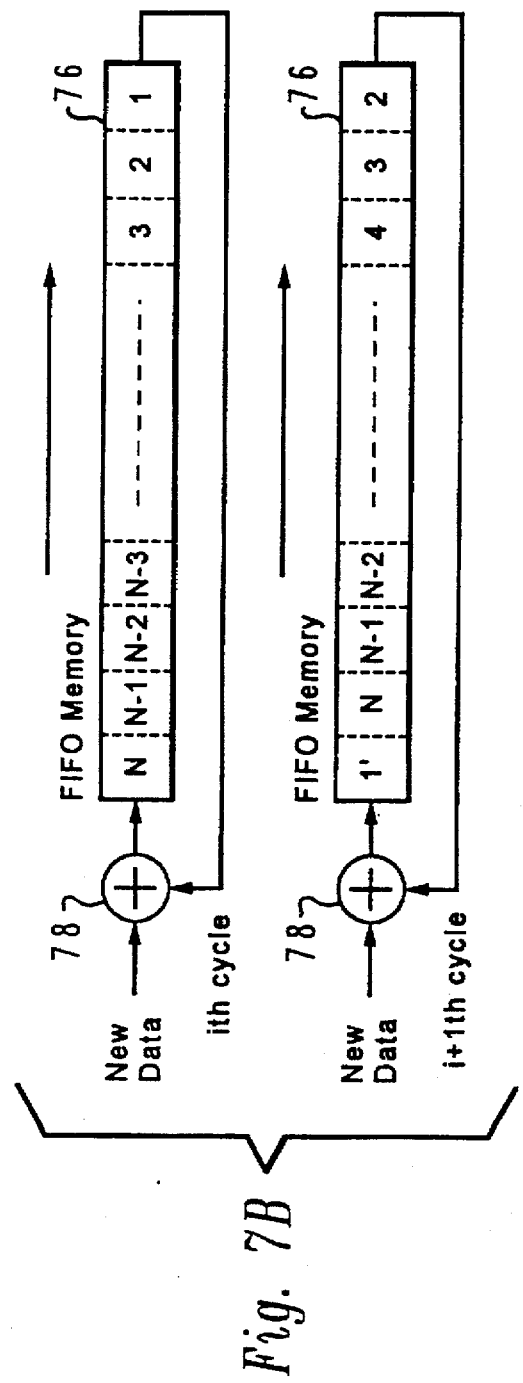
FIG. 7B is a block diagram of the operation of the FIFO data accumulation system of FIG. 7.

Once there are N data words pushed onto the FIFO array, and the PN code length is N, the first pushed FIFO data is then pushed out to be added to the next newly sampled data. Next, the sum is pushed back into the FIFO as shown in FIG. 7B.

Figure 7C:
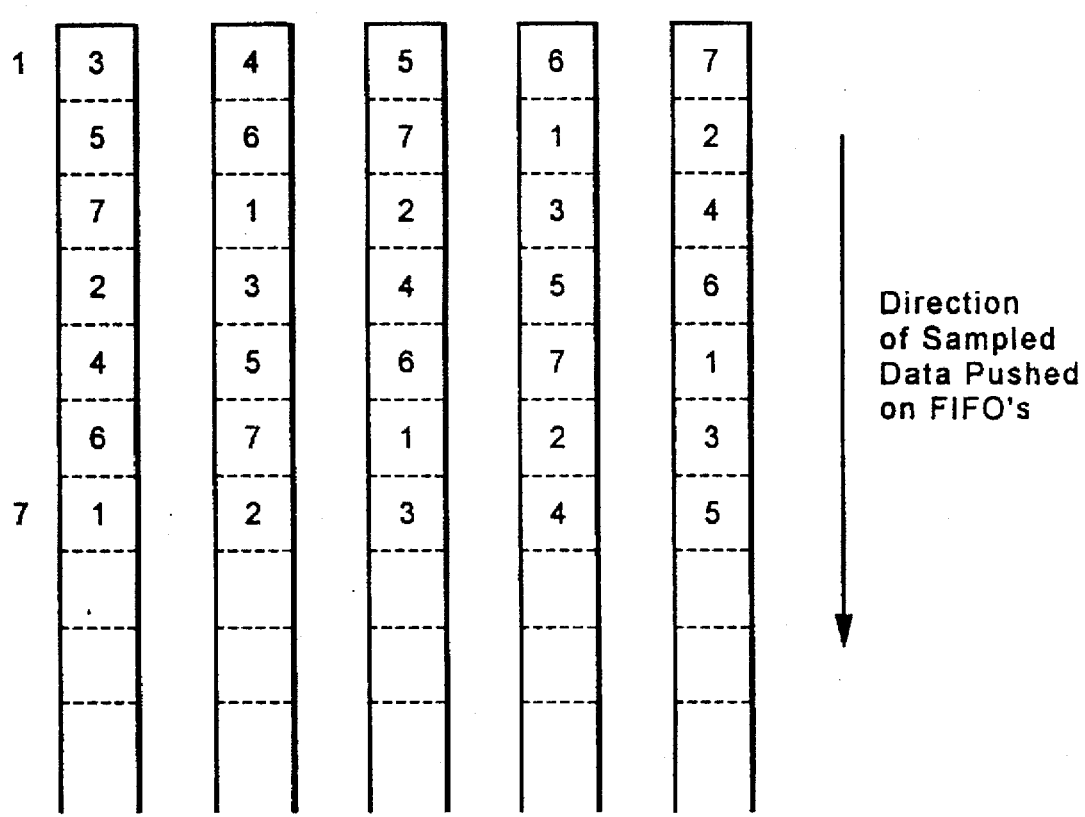
FIG. 7C is an example of the serial data sequence in the FIFO of FIG. 7.

Each FIFO 76 keeps N integrated data words, and each ADC 74 recycles to sample data in every five clock cycles. This leads to five serial averaged N-bit PN code data sequences stored in the five FIFOs 76. An example of the five averaging cycles is illustrated in FIG. 7C. Seven bit PN code data sequence is stored or distributed on each FIFO 76. The structure provides a high speed non-stop sampling at 500 megahertz with data accumulation. Since the five ADCs 74 sample data sequentially, each ADC 74 has five clock cycles (5 nanoseconds) to process valid data and to push it onto its respective FIFO 76 before the new trigger starts a new data sampling:

A data processing unit (DPU) 85 is associated with the digitizer accumulator of FIG. 7, and operates at a clock speed of 66.7 megahertz with a 32 bit digital signal processor, such as an AT&T DSP 3210. The DPU 85 has an instruction cycle rate of one fourth of the incoming frequency. It uses two I/O instruction cycles to fetch data from the eight-bit parallel I/O port. This allows a data transfer rate from the FIFOs to the DPU at 66.7/(2*4)=8.3 megabyte-per-second. Since there are 5*N 24-bit data words or 15*N data bytes in the FIFO for N-bit PN-code, this yields a total data fetch time of 15*N/8.3=1.8*N microseconds. The DPU 85 also requires the same amount of time to clear the FIFOs before the next data acquisition cycle begins, which, in a 1,023 PN-code arrangement, requires 2*1.8*1023=3.68 microsecond data fetch/reset time. Therefore, the system allows a 99.4% duty cycle, based on the maximum integration time of 0.67 seconds.

Figure 8:
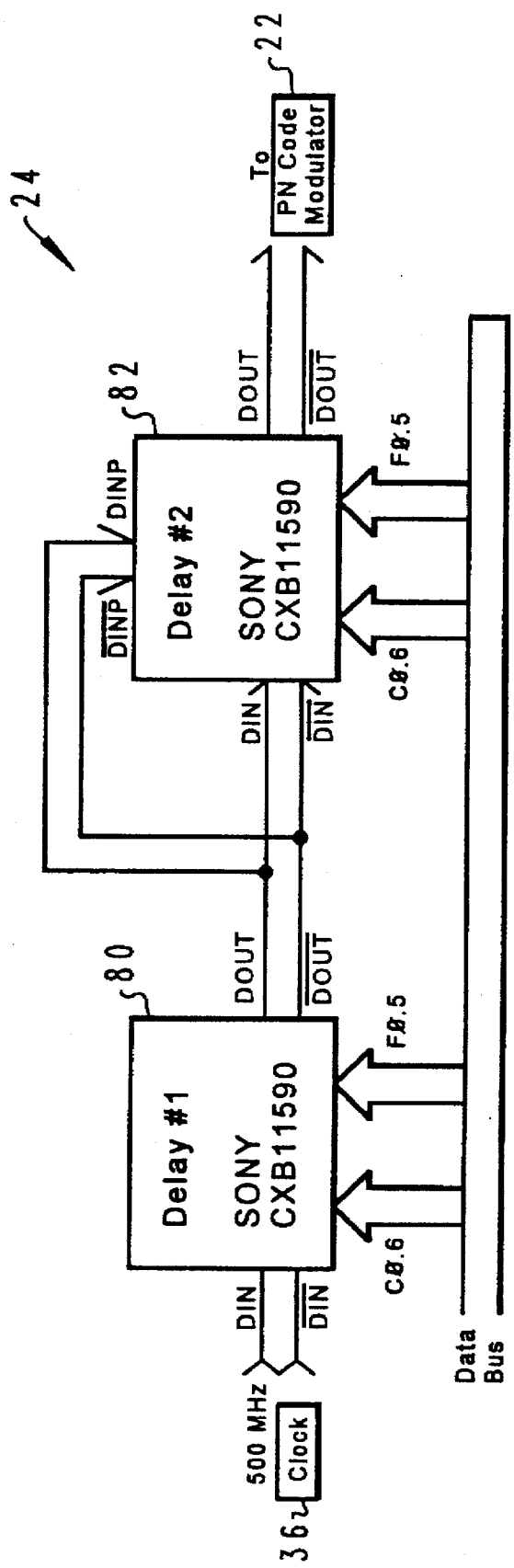
FIG. 8 depicts a block diagram of the delay generator according to FIG. 1.

FIG. 8 illustrates in block form programmable delay generator 24 from FIG. 1. Programmable delay generator 24 uses two programmable delay generators (PDG) 80 and 82 from, for example, Sony Corporation, Model No. CXB119590Q, which are connected in such a fashion as to allow the cascading of the multiple programmable delay chips without the need for any external gating. Preferably, the PDGs 80 and 82 use ultrafast ECUnPS chip technology for precise time adjustment or phase delay. The delay generation is achieved by purely differential ECL gate delays; the device operates with an input bandwidth greater than one gigahertz. In spite of the internal two nanosecond worst case fixed delay range, the delay generator 24 is still programmable with five picosecond per delay step resolution. The programmable digital delay value is latched into the D-type internal registers. The two PDG 80 and 82 provide coarse steps and fine steps. The coarse steps can be set in approximately 160 picoseconds increments, up to 128 steps, by selecting input lines C0–C6. The fine step may be set in approximately five picosecond increments, up to sixty-four steps, by selecting input lines F0–F6. The delay range of each PDG 80 and 82 is 20.635 nanoseconds and cascading two of them provides a total of 41.27 nanoseconds programmable delay range. The duty cycle adjustment is controllable in the same manner as the delay length setting, which is set through the step length select input.

The 500 megahertz system clock 48 is fed to the input DIN of the first stage programmable delay generator 80, and the second stage programmable delay generator 82 output DOUT is connected to the PN-code modulator 22. The digital delay inputs are programmed by the DPU 85. Table 2 gives an example of programming four different phase shifts with a single delay chip using a 500 megahertz system clock, which has a two nanosecond period.

TABLE 2

| C0 | C1 | C2 | C3 | C4 | C5 | C6 | F0 | F1 | F2 | F3 | F4 | Delay (ns) |
|---|---|---|---|---|---|---|---|---|---|---|---|---|
| 0 | 0 | 0 | 0 | 0 | 0 | 0 | 0 | 0 | 0 | 0 | 0 | 2.00 (internal delay) |
| 1 | 1 | 0 | 0 | 0 | 0 | 0 | 0 | 0 | 1 | 0 | 0 | 2.50 |
| 0 | 1 | 1 | 0 | 0 | 0 | 0 | 0 | 0 | 0 | 1 | 0 | 3.00 |
| 1 | 0 | 0 | 1 | 0 | 0 | 0 | 0 | 0 | 1 | 1 | 0 | 3.50 |

The second cascaded delay generator 82 can be used for additional delay and system timing adjustment for internal delay. The distance of interconnection between systems must be as short as possible to minimize the signal propagation delay. Excessive jitter may cause asynchronization between digitizer 40 and PN code modulator 22. Thus, it is critical to minimize the jitter, which causes the systematic noise in the correlation data. According to the chip AC characteristics, the jitter of the delay generators is typically 7.0 picoseconds. The jitter of the device is less than that which can be measured without resorting to tedious and specialized measurement techniques.

DPU 85 performs preprocessing of the raw sample data and the cross correlation before further analysis. Several different hardware or software embodiments are available for implementing the cross correlation processing. One embodiment allows the correlation to be performed with direct time domain calculation. The correlation takes about thirty seconds to one minute for the computer 18, which uses an Intel 486 chip, or the like, to process one data set. N-bit codes requires $N^2$ multiplications and N-1 additions, which causes the processing time to grow exponentially; accordingly, this embodiment is not suitable for a real-time system.

The second embodiment uses a fast hardware solution, which is implemented with correlator integrated circuits that are available from TRW, NeuraLogix, and Harris Semiconductor. The correlator used in the system operates with 256×1 bit at 40 megahertz. Several chips are cascaded together for a longer code length and an extra weighted summing circuit is used for providing an eight-bit depth data.

Figure 9:
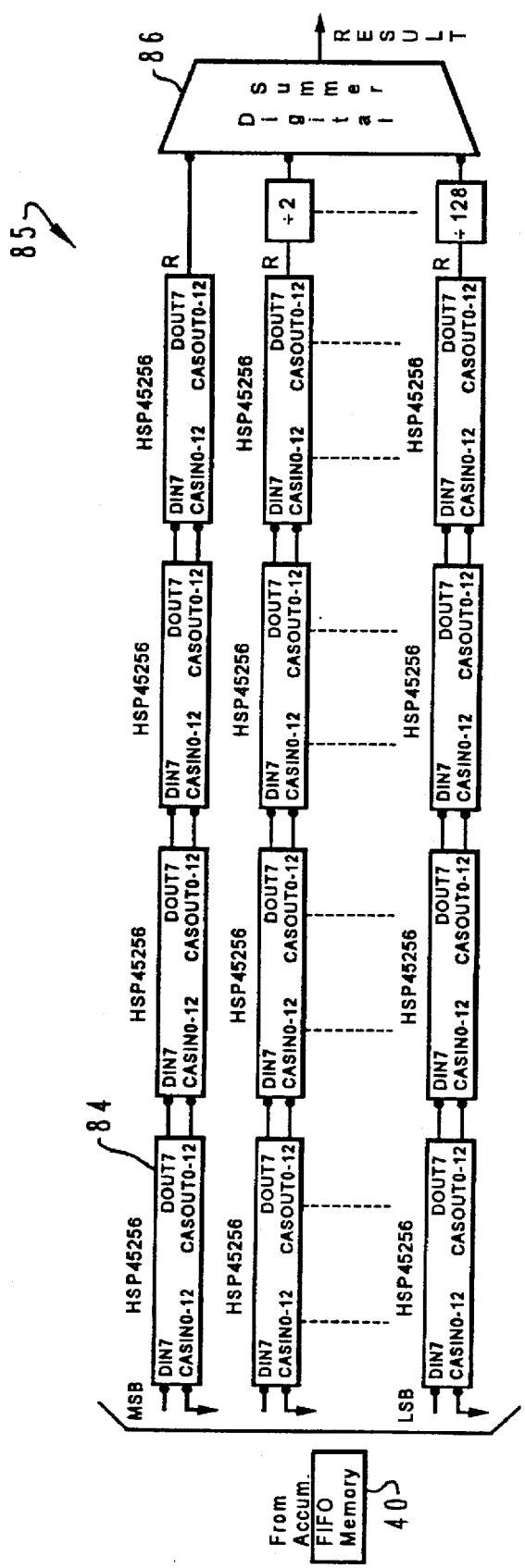
FIG. 9 is a block diagram of the correlator of FIG. 1.

FIG. 9 shows a block diagram of DPU 85 using a plurality of correlators 84 that provide a 1,024 by eight correlation capability. This arrangement can perform both the correlation operation on the input data and a weighted averaging of the computed correlation scores via digital scanner 86 to reflect the accuracy with which the true value of each bit is known. Each correlator 84 is pipelined with the correlation becoming valid during the third clock cycle after the data sequences is input. Each correlator 84 has only serial inputs and outputs. It requires 2*N clock cycles for N-bit code to shift in the data and shift out the calculated correlation. It requires one additional clock cycle to obtain each correlation element. For example, in a code length of 1,023 bit PN-code having an eight-bit depth data, 4*8=32 correlator chips are needed to perform this level of data throughput. Unfortunately, this configuration is not a cost effective or power efficient solution for correlation; however, the timing required is only 20*(2*N+N) nanoseconds to calculate the cross correlation of an N-bit PN code at 50 megahertz. In the example of the 1,023 bit code, this time required would only be about 41 microseconds.

A third embodiment is contemplated that uses discrete fast Fourier transform (DFT) techniques. Cross correlation using the DFT method, which is based on a fast Fourier transform algorithm, provides for a faster correlation result compared to the relatively long time required in the time domain computation. For example, in an eight-bit PN-code, DFT of both the data and reference code takes an $N*\log_2 N$ operations, and the inverse transform takes another $N*\log_2 N$ operations. Thus, there are $2*N*\log_2 N$ operations required. The processing time difference between the frequency domain and the time domain becomes enormous for large $N_2$. DFT operations are speeded up with specialized digital signal processing (DSP) processors. High performance DSP processors are available that process more than 30 million instructions per second (MIPS). One such chip is manufactured by Texas Instruments Model No. TMS320C5x, which provides 40 MIPS performance at a low power consumption of 1.5 mA/MIPS. Other DSP processors are available from AT&T and Motorola.

Figure 10:
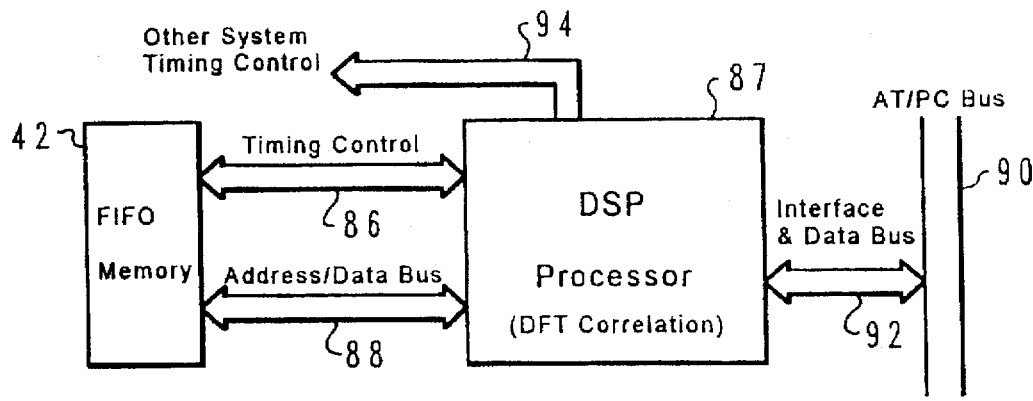
FIG. 10 depicts a block diagram of the digital signal processor interface of FIG. 1.

FIG. 10 is a block diagram illustrating a DFT correlation arrangement using a DSP processor with appropriate interface. DSP processor 87 is coupled to the FIFOs 74 of accumulator 42 through timing control bus 86 and address/data bus 88. Accumulator 44 accumulates the data before being processed through DSP processor 84, which is connected to the computer bus 90 through interface and data bus 92. Additional timing control is provided to DSP processor 44 through system timing control bus 94.

In operation, the accumulated data in accumulator 42 of FIG. 7 is transferred to DSP processor 87 and held in chip internal RAM memory. The data is then transformed by calling the built in DFT software library functions. The data is multiplied with the complex conjugate of the pre-transformed reference code. The inverse Fourier transform converts the information back to the time domain from the frequency domain to obtain final cross correlation. The DSP processor 87 reduces the execution time of all fast Fourier transforms by virtue of its 50-nanosecond instruction cycle time. For example, using a 1,023 PN code, it requires $2*1023*\log_2 1023 = 20,457$ operations and takes the DSP 44 about 1.0 milliseconds to obtain correlation. Both the discrete chip correlator system of FIG. 9 and the DSP discrete fast Fourier transform correlator of FIG. 10 can provide real-time correlation processing solutions. In contrast to the hardware correlators 41 microsecond processing time, the processing time using the DFT solution is 1.0 milliseconds; the former method is 25 times faster than the DFT method. However, if 2,000 1,023-bit PN code are averaged with four phase shifts at 500 megahertz clock cycle, it requires $2,000*1023*4*2=16.4$ milliseconds to collect the data. Thus, there are no significant differences between the two methods for the system to produce real-time final correlation. The DFT method requires only a single chip to implement, while the discrete correlator method uses 32 correlator chips. Using the digital signal processor to calculate cross correlation with fast discrete Fourier transform algorithm is considered a more efficient approach. In addition, the DSP processor provides timing control and interface to the system.

Fluorescence excitation sources used in biochemical and medical probes am typically lasers having wavelengths in the blue and green visible spectral range. One blue laser light source uses a frequency doubling of a semiconductor master oscillator power amplifier (MOPA), to provide a high power blue laser source. A high power, one watt, continuous wave near-jr (980 nm) MOPA system may be used, which is currently available from Spectra Diode Labs. This unit provides high power with a diffraction-limited single transverse and longitudinal mode collimated beam in a monolithically integrated MOPA structure. The high power Guassian beam quality and the single longitudinal mode structure is highly suited for frequency doubling with room temperature matched Potassium Niobate, thereby providing a visible wave length near 490 nanometers. The output is modulated by PRM modulating the oscillator at high frequencies greater than 20 megahertz.

Semiconductor lasers are used because of their ability of direct modulation of diode lasers by modulation of the injection current. This method of output modulation eliminates the requirement for a complicated external electro-optic modulator, which is normally implemented in the diode pumped solid state laser (DPSSL) systems.

In one embodiment, diode pumped solid state lasers (DPSSL), particularly with UCAF and USAF, are used for lidar and medical applications. DPSSL systems have relatively high output power and high system reliability, which makes them particularly suitable for stable frequency doubling. DPSSL is a high gain system with a good beam quality and a moderate efficiency, but it requires the use of external modulators to code information. The electro-optic crystal modulators, unfortunately, have a fairly low power damage threshold and thus limit the total output power of the transmitter.

One solution to the limitations of DPSSL and semiconductor lasers, which also combines the features of the two systems and satisfies the requirements for frequency doubling, is a hybrid MOPA system.

Figure 11:
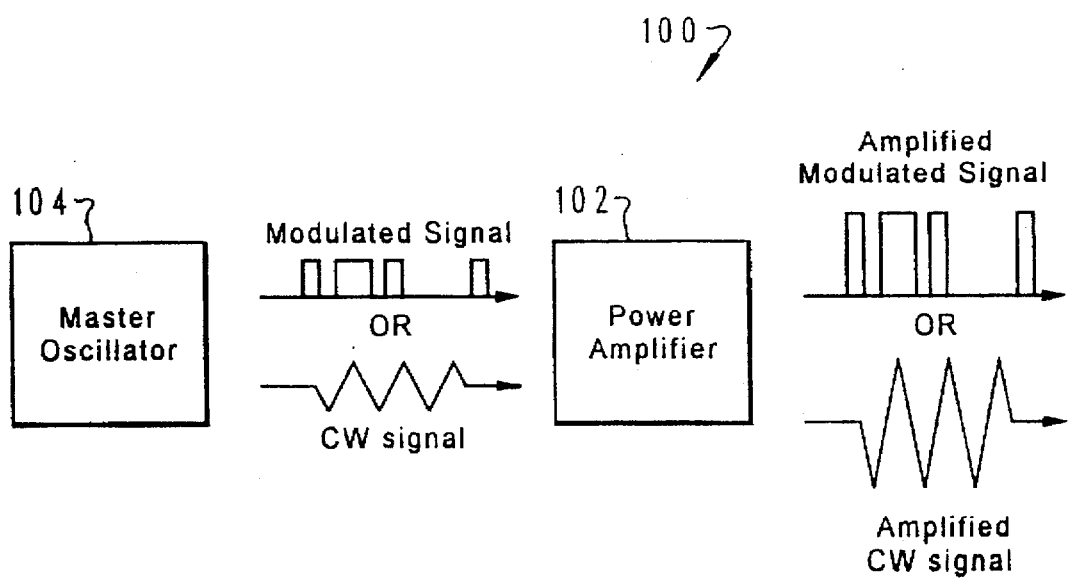
FIG. 11 is a schematic drawing of the master oscillator power amplifier (MOPA) laser used in FIG. 1.

FIG. 11 illustrates a particular MOPA laser system 100. A power amplifier 102 is driven by a low-power master oscillator 104. Master oscillator 104 consists of a semiconductor laser and the power amplifier 102 consists of a diode laser pumped solid state laser (DLPSSL). This MOPA laser has the advantages of direct modulation capability of the semiconductor laser oscillator and the high gain of the solid state laser amplifier.

Laser system 100 uses a novel pumping geometry, which is based in part upon the tightly folded resonator concept, in conjunction with the efficient diode pumping of a UCAF laser and provides a substantial improvement of diode pump efficiency an enhancement of the power amplifier. The use of the folded geometry overcomes the problems related to the focusing of the individual emitters in the laser diode array by combining them before delivering the beams to the laser crystal. The optical component needed for shaping and delivering the pump beams is also simplified since it is used in the closed coupling, which also provides a high degree of compactness and high throughput efficiency. This arrangement also provides the ability to maintain small spot sizes at the crystal surface in the pumping region without the danger of causing optical damage, since the output of each emitter diode is focused separately. By contrast, the situation where beams from multiple emitters are combined and focused to the same spot causes very high power densities at the crystal surface. Further, this arrangement has the advantage in that both the top and bottom faces can be used for pumping.

Figure 12A:
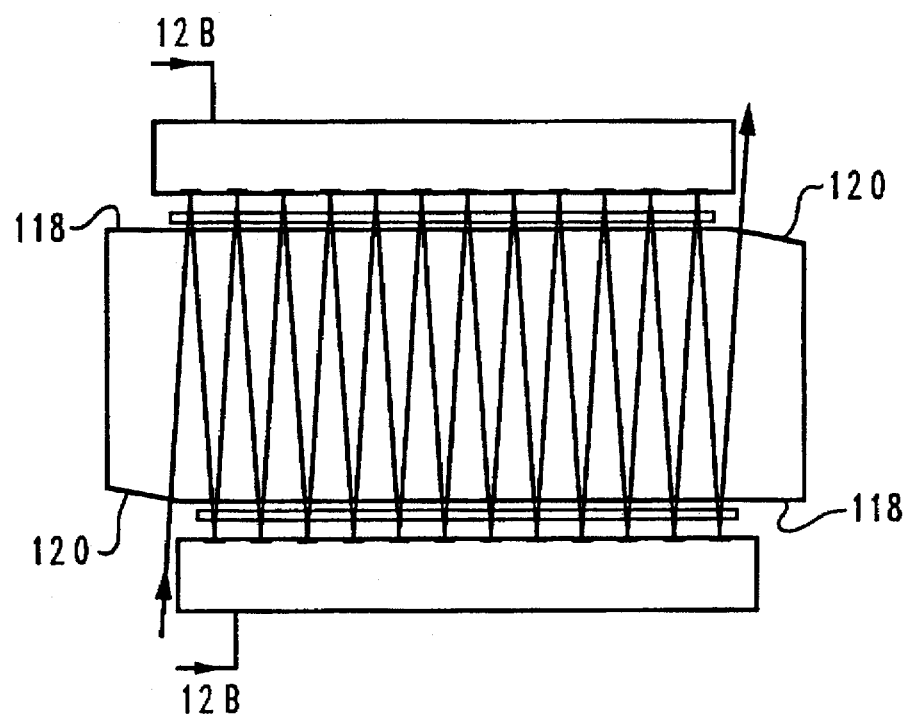
FIGS. 12A and 12B depict a diagram of the master oscillator power amplifier (MOPA) laser in FIG. 11.
Figure 12B:
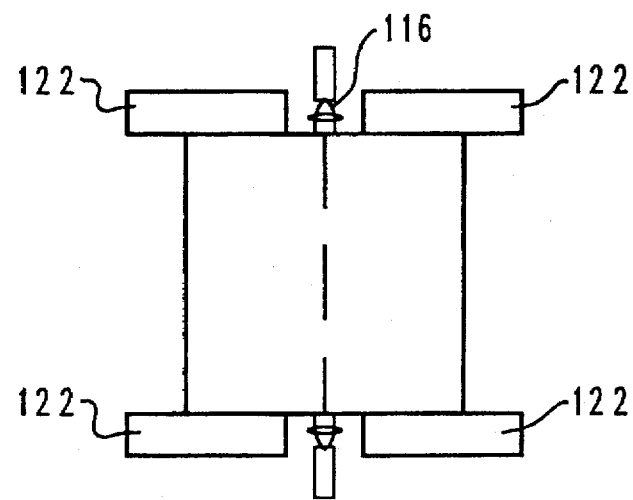

The folded resonator system 110, depicted in FIGS. 12A and 12B include a pair of pump laser diode arrays 112 that sandwich a first amplifier 114, which is composed of a laser crystal. An input from a master oscillator (not shown) enters the first amplifier 114 and amplified through the single path. The pump diode laser beams are collimated on a fast axis only by a collimating cylindrical lens 116. The top and bottom of the UCAF slab are dichroic coated 118, slant faces are AR coated 120. Heat sinks 122 are affixed on the outer edges of the amplifier to dissipate heat. FIG. 11B is a cross sectional view of the same folded resonator system of FIG. 11A. The collimating cylindrical lens 116 is placed between the pump laser diode array 112 and first amplifier 114.

The output frequency of the folded resonator system 110 is tuned by the oscillator wavelength direly; thus, without any tuning element on the amplifier, this arrangement can cover the wavelength range between 720 nanometers and one micrometer directly following the oscillator wavelength. For example, an AlGaAs laser system can cover this wavelength range contiguously with few gaps. The amplitude is modulated by the oscillator bias current directly up to a few hundred megahertz. A diode pumped UCAF laser output is frequency doubled. This laser provides a wide range of fluorescence excitation wavelength, with the flexibility of the fast PRM modulation, in a simple and cost effective manner, In addition to the fluorescence excitation applications, the present invention is applicable to subnanosecond photon migration detection and scanning. The PRM-correlation method provides a full decay profile of the impulse response function with high time resolution over the entire decay, which eliminates using the assumption of exponential decay. Any functional behavior of the impulse response is completely retrieved using the PRM-correlation method. The method provides a time resolution as high as 50 picosecond, which allows a depth resolution of seven millimeters in the tissue. In contrast to the transillumination of the picosecond laser pulse, PRM-correlation methods for time resolved reflectants measurements from the tissue are applied. In this method, the optical characteristics-absorption and scattering-of the tissue are retrieved by deconvolving the time decay profile of the correlation function. The high spacial resolution transmission image of the tissue is then obtained by this method.

The PRM-correlation method also lends itself to retrieve the effective extinction coefficient of the tissue by time resolved decay measurements of a simple exponential impulse response function. The method is able to retrieve the signature of an object imbedded in a highly scattering medium. The information is not necessarily shape dependent, but may be based on other optical properties, such as, for example, the absorption, scatter size, or location, or any combination thereof. It is the contrast of the retrieved parameter over the global field that is a more practical method than the absolute measurement.

The apparatus provides a powerful fluorescence measurement tool for biological and medical samples, as well as for other organic and inorganic samples. Additional applications include the biochemical medical research as well as medical diagnostics tool for in-vivo applications. The method offers both the fluorescence intensity and decay time measurement in a CW mode operation, which is not possible with some other conventional techniques. A system also can operate in photon migration measurement mode for many medical diagnosis. Applications, such as breast cancer detection and blood absorption measurements, may be performed without changing the system configurations except for the optical filter.

This system also is configurable as a remote sensor for environmental monitoring on board an aircraft or a ground vehicle. The sensitivity of the sensor is sufficient enough for remote sensing of minute fluorescence signatures in the photon counting mode. The total signal power of a 200 milliwatt system is equivalent to a 2 megawatt, 10 hertz pulse system conventionally used in air-borne application. Thus, based on the novel features of the time resolution capability, the sensor offers a capability for oceanographic fluorascencor, wherein the depth profile of the fluorescence intensity is of interest in terms of ocean color remote sensing. Additional applications that can benefit from accurate time resolution and ranging capabilities include robotics, space docking, manufacturing industries, aviation, transportation.

The invention thus provides a compact, low-power consumption, light weight, robust sensor for fluorescence measurement or time-resolved spectroscopy (TRS) measurement. Additionally, the invention provides for enhanced time resolution beyond that which is currently available, ideally up to a few tens of picoseconds. The invention is able to obtain the time-resolved measurement by use of digital processing of a low-power, continuous wave signal. Additionally, the system is able to determine the lapse time by measuring the time shift of a reference modulation sequence using the cross correlation of a return signal with the reference signal.

The high resolution time delay is introduced at the start of each modulation cycle and the high resolution measurement is constructed by interlacing the data set thus obtained. The high resolution TRS or fluorescence measurement is achieved by correlation calculation of the measured data set and the reference code, and deconvolving the autocorrelation of the reference code. Since the transmitter power may be substantially lower than the peak power of the pulse system, the system is able to achieve a substantially high signal to noise ratio. Moreover, the differential measurement in the time resolved spectroscopy system may be implemented without additional channel by employing two different wave length lasers modulated by different PRM codes and separating the signals by the correlation computation with the corresponding reference codes.

While the invention has been particularly shown and described with reference to a preferred embodiment, it will be understood by those skilled in the art that various changes in form and detail may be made therein without departing from the spirit and scope of the invention.

What is claimed is:

1. A method of performing time resolved measurement of fluorescent response or scattering response of an object, comprising:

propagating a light wave generated by a light source, said light wave having an amplitude which is modulated with pseudo-random code of N cycles per second having a first time resolution, wherein N is an integer greater than one;

transmitting said modulated light wave to an object;

detecting a return signal from said object in response to said transmitted, modulated light wave;

digitizing said detected return signal at a rate of N×M per second, wherein M is the number of cycles of said pseudo-random code in said modulated light wave, to create a digitized detected signal, wherein M is an integer greater than one;

processing said digitized detected signal further comprising the step of:

calculating a correlation value between said digitized detected signal and said pseudo-random code to obtain a correlation function with a second time resolution which is increased over said first time resolution.

2. The method according to claim 1 wherein said digitizing step further comprises the step of:

introducing M different delay times to control synchronization between said light wave modulating step and said digitizing step.

3. The method according to claim 1 wherein said correlation value is used to obtain a time resolved impulse response of said object by way of the step further comprising:

relating a correlation coefficient with each time shift to a response signal amplitude by a corresponding time delay from said impulse response.

4. The method according to claim 3 wherein said light wave is a first light wave having a first wave length, and further comprising the steps of:

using a second light wave having a second wavelength wherein each light wave is modulated by a different pseudo-random modulation code of different lengths, to create first and second return signals; and separating said return signals from random noise or bias with corresponding reference code by means of common noise rejection.

* * * * *

UNITED STATES PATENT AND TRADEMARK OFFICE
CERTIFICATE OF CORRECTION

PATENT NO. : 5,737,077
DATED : April 7, 1998
INVENTOR(S) : Lee et al.

It is certified that error appears in the above-identified patent and that said Letters Patent is hereby corrected as shown below:

Column 1, line 11: change "the resolved" to --time-resolved--.

Signed and Sealed this

Fourteenth Day of July, 1998

Attest:

BRUCE LEHMAN

Attesting Officer

Commissioner of Patents and Trademarks